(12) United States Patent
Nakamoto

(10) Patent No.: US 10,930,433 B2
(45) Date of Patent: Feb. 23, 2021

(54) MULTILAYER CERAMIC ELECTRONIC COMPONENT

(71) Applicant: Murata Manufacturing Co., Ltd., Nagaokakyo (JP)

(72) Inventor: Atsushi Nakamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/691,663

(22) Filed: Nov. 22, 2019

(65) Prior Publication Data
US 2020/0168396 A1    May 28, 2020

(30) Foreign Application Priority Data
Nov. 27, 2018    (JP) ................ 2018-221260

(51) Int. Cl.
*H01G 4/232* (2006.01)
*H01G 4/12* (2006.01)
*H01G 4/30* (2006.01)

(52) U.S. Cl.
CPC ............. *H01G 4/12* (2013.01); *H01G 4/2325* (2013.01); *H01G 4/30* (2013.01)

(58) Field of Classification Search
None
See application file for complete search history.

(56) References Cited

U.S. PATENT DOCUMENTS

| 2014/0043724 A1* | 2/2014 | Kang | H01G 4/2325 361/321.2 |
| 2019/0304683 A1* | 10/2019 | Terashita | H01G 2/065 |
| 2020/0168400 A1* | 5/2020 | Nakamoto | H01G 4/012 |
| 2020/0211774 A1* | 7/2020 | Onodera | H01G 4/2325 |

FOREIGN PATENT DOCUMENTS

JP    11-162771 A    6/1999

* cited by examiner

*Primary Examiner* — Dion Ferguson
(74) *Attorney, Agent, or Firm* — Keating & Bennett, LLP

(57) ABSTRACT

A multilayer ceramic electronic component includes a laminated body. External electrodes are provided on both end surfaces of the laminated body. The external electrodes include a base electrode layer, a conductive resin layer disposed on the base electrode layer, and a plating layer disposed on the conductive resin layer. The conductive resin layer includes a first layer located on the base electrode layer, a second layer located on the first layer, and a third layer located on the second layer. A void volume of the first layer and the third layer calculated by a predetermined equation is about 10 vol % or less, and a void volume of the second layer is about 16 vol % or more, and thicknesses of the first layer, the second layer, and the third layer satisfy predetermined conditions.

18 Claims, 6 Drawing Sheets

MULTILAYER CERAMIC ELECTRONIC COMPONENT

CROSS REFERENCE TO RELATED APPLICATIONS

This application claims the benefit of priority to Japanese Patent Application No. 2018-221260 filed on Nov. 27, 2018. The entire contents of this application are hereby incorporated herein by reference.

BACKGROUND OF THE INVENTION

1. Field of the Invention

The present invention relates to a multilayer ceramic electronic component.

2. Description of the Related Art

In recent years, ceramic electronic components represented by multilayer ceramic capacitors have been used under harsher environments than ever before.

For example, electronic components used in mobile devices, such as mobile phones and portable music players are required to withstand the impact of falling. Specifically, it is necessary to reduce or prevent detachment of the electronic component from a mounting substrate or to reduce or prevent cracking of the electronic component even when it receives the impact of falling.

Moreover, the electronic component, such as an electronic control unit (ECU), used for vehicle-mounted apparatuses is required to withstand the impact of a thermal cycle. Specifically, it is necessary to reduce or prevent cracking of the ceramic electronic component even when it is subjected to a deflection stress generated by linear expansion and contraction of the mounting substrate and a tensile stress applied to the external electrode due to a thermal cycle. That is, when the stress exceeds the strength of the laminated body (ceramic element assembly), cracks are generated in the laminated body (ceramic element assembly).

As a countermeasure, techniques for alleviating the stress received from the substrate even under a severe environment, and reducing or preventing cracking of the laminated body for example, by using a conductive thermosetting resin containing a metal powder for the external electrode of the multilayer ceramic electronic component as disclosed in Japanese Patent Application Laid-Open No. 11-162771 have been proposed.

For example, in a multilayer ceramic electronic component as disclosed in Japanese Patent Application Laid-Open No. 11-162771, generally, a thermosetting resin layer is formed so as to completely cover the baked electrode layer. In design, a fail-safe function to release the stress applied to the multilayer ceramic capacitor is provided, when a large substrate deflection stress is applied, by causing a fracture crack to be generated, from the tip of the thermosetting resin layer as a starting point, inside of the thermosetting resin layer, at the interface between the thermosetting resin layer and the nickel plating layer, or at the interface between the thermosetting resin layer and the capacitor body (laminated body), and development of the crack into the capacitor body is reduced or prevented.

However, the location of the development of the fracture crack may not be limited to any one of the inside of the thermosetting resin layer, the interface between the thermosetting resin layer and the nickel plating layer, and the interface between the thermosetting resin layer and the capacitor body, but the development of the fracture crack may bend from the thermosetting resin layer side toward the capacitor body side. This is because fragility of the fragile point for implementing the fail-safe function is unstable, and the fracture passage affected by the fragility variability is easily changed into the capacitor body with respect to the fracture passage starting from the tip of the baked electrode layer.

Therefore, for example, when the multilayer ceramic electronic component is mounted on the mounting substrate, the stability of the fail-safe function against the mounting substrate bending stress cannot be obtained.

SUMMARY OF THE INVENTION

Preferred embodiments of the present invention provide highly reliable multilayer ceramic electronic components which each improve the stability of a fail-safe function against a crack caused by a stress received from a substrate under a severe environment.

A multilayer ceramic electronic component according to a preferred embodiment of the present invention includes a laminated body including a plurality of laminated ceramic layers and a plurality of laminated internal electrode layers, and including a first main surface and a second main surface facing each other in a lamination direction, a first side surface and a second side surface facing each other in a width direction orthogonal or substantially orthogonal to the lamination direction, a first end surface and a second end surface facing each other in a length direction orthogonal or substantially orthogonal to the lamination direction and the width direction, in which the plurality of internal electrode layers include a first internal electrode layer exposed at the first end surface, and a second internal electrode layer exposed at the second end surface, a first external electrode disposed on the first end surface connected to the first internal electrode layer, a portion of the first and second main surfaces, and a portion of the first and second side surfaces, and a second external electrode disposed on the second end surface connected to the second internal electrode layer, a portion of the first and second main surfaces, and a portion of the first and second side surfaces, in which the first external electrode and the second external electrode include a base electrode layer including a metal, a conductive resin layer including a thermosetting resin and a metal component, the conductive resin layer being disposed on the base electrode layer, and a plating layer disposed on the conductive resin layer, in which the conductive resin layer includes a first layer located on the base electrode layer, a second layer located on the first layer, and a third layer located on the second layer, in which the first layer and the third layer have a void volume calculated by the following Equation (1) of about 10 vol % or less, and the second layer has a void volume calculated by the following Equation (1) of about 16 vol % or more, and in which when a length of the first layer in contact with a portion of the first and second main surfaces, and the first and second side surfaces is denoted as Dimension A, a length of the second layer in contact with the first and second main surfaces, and a portion of the first and second side surfaces is denoted as Dimension B, and a length of the third layer in contact with a portion of the first and second main surfaces and a portion of the first and second side surfaces is denoted as Dimension C, a ratio between Dimension A, Dimension B, and Dimension C is Dimension A:Dimension B:Dimension C=about 15 or more and about 70 or less:about 10 or more and about 65 or less: about 10 or more and about 65 or less, where a ratio of Dimension A+a ratio of Dimension B+a ratio of Dimension C=100.

$$\text{Void volume (vol \%)} = (a-b-c)/a \times 100 \qquad (1)$$

a: Measured film thickness (physical thickness)
b: Metal film thickness (fluorescent X-ray film thickness)
c: Theoretical resin film thickness calculated from PVC from b According to preferred embodiments of the present invention, it is possible to provide highly reliable multilayer ceramic electronic components which each improve the stability of the fail-safe function against a crack caused by the stress received from the substrate under a severe environment.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the accompanying drawings.

1. Multilayer Ceramic Electronic Component

Figure 1:
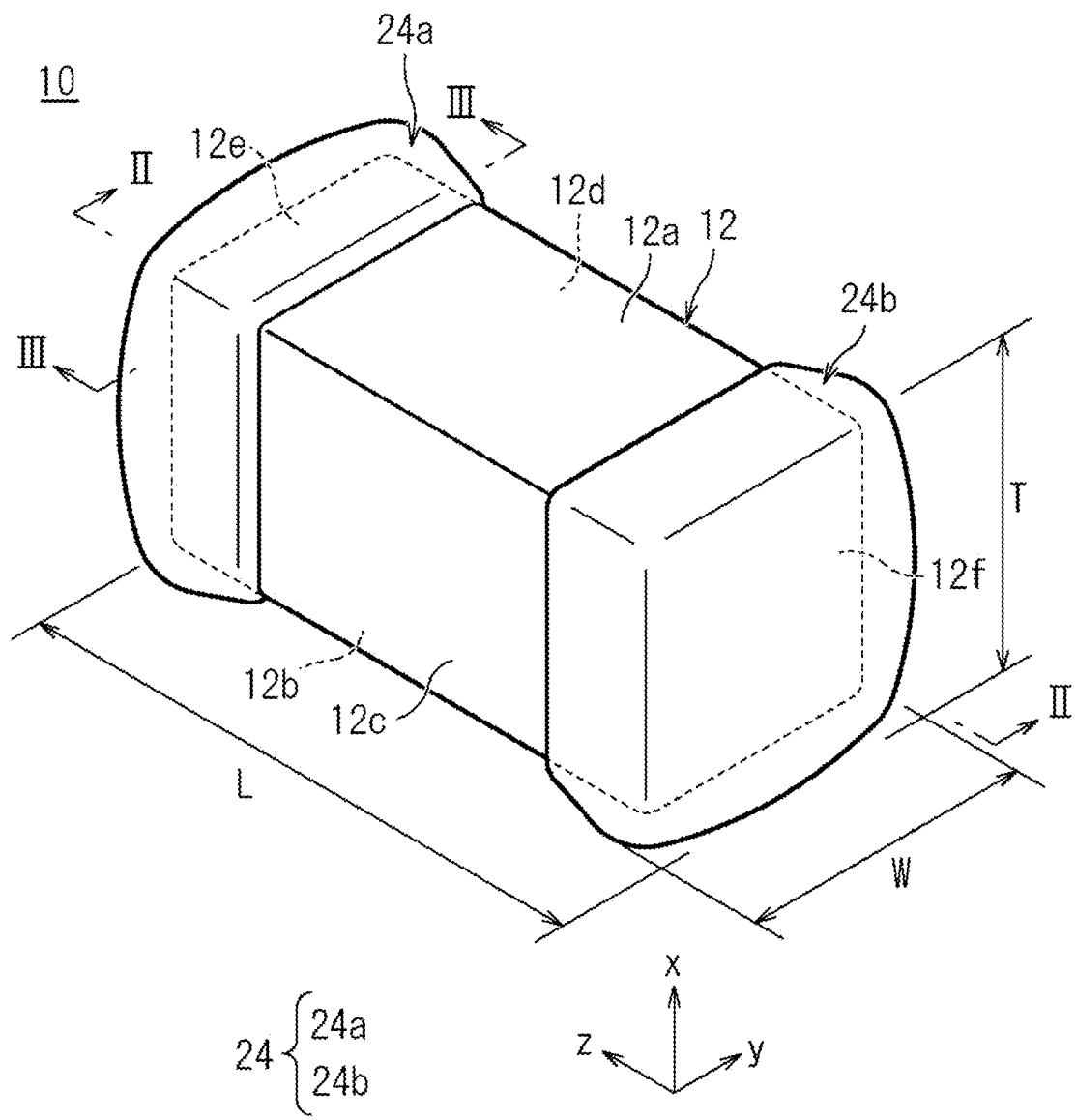
FIG. 1 is an external perspective view showing an example of a multilayer ceramic capacitor according to a preferred embodiment of the present invention.
Figure 2:
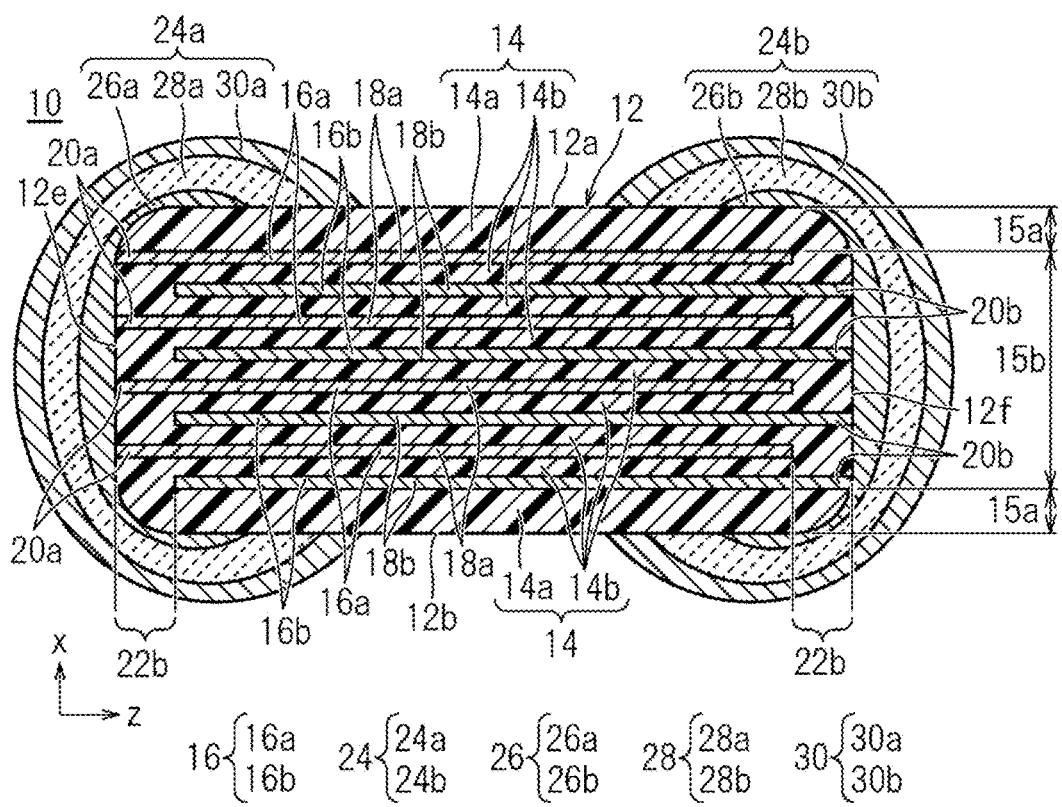
FIG. 2 is a cross-section view taken along line II-II of FIG. 1 showing a multilayer ceramic capacitor according to a preferred embodiment of the present invention.
Figure 3:
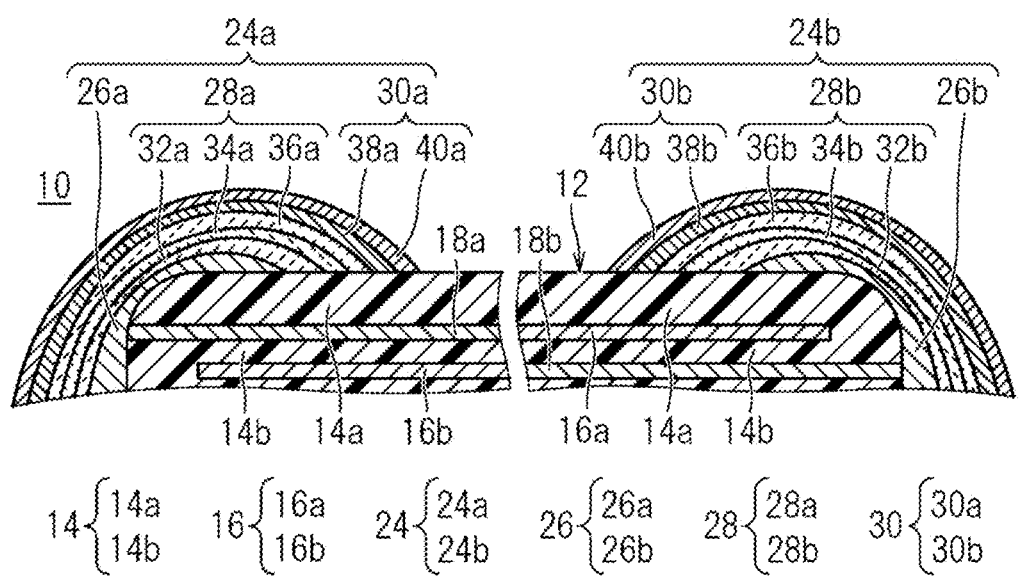
FIG. 3 is an enlarged view of an external electrode in FIG. 2 and the vicinity thereof.
Figure 4:
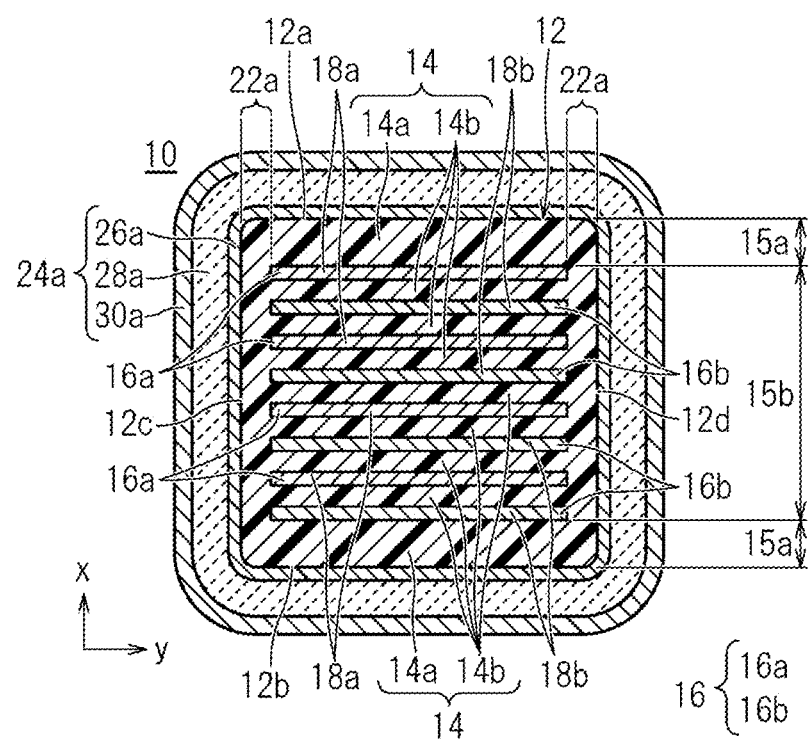
FIG. 4 is a cross-section view taken along line III-III of FIG. 1 showing a multilayer ceramic capacitor according to a preferred embodiment of the present invention.

A multilayer ceramic capacitor will be described as an example of a multilayer ceramic electronic component according to a preferred embodiment of the present invention. FIG. 1 is an external perspective view showing an example of a multilayer ceramic capacitor according to a preferred embodiment of the present invention. FIG. 2 is a cross-section view taken along line II-II of FIG. 1 showing a multilayer ceramic capacitor according to a preferred embodiment of the present invention, and FIG. 3 is an enlarged view of an external electrode in FIG. 2 and the vicinity thereof. FIG. 4 is a cross-section view taken along line III-III of FIG. 1 showing a multilayer ceramic capacitor according to a preferred embodiment of the present invention.

As shown in FIGS. 1 to 3, a multilayer ceramic capacitor includes a rectangular or substantially rectangular parallelepiped laminated body 12.

The laminated body 12 includes a plurality of laminated ceramic layers 14 and a plurality of internal electrode layers 16. Furthermore, the laminated body 12 includes a first main surface 12a and a second main surface 12b facing each other in a lamination direction x, a first side surface 12c and a second side surface 12d facing each other in a width direction y orthogonal or substantially orthogonal to the lamination direction x, and a first end surface 12e and a second end surface 12f facing each other in a length direction z orthogonal or substantially orthogonal to the lamination direction x and the width direction y. The laminated body 12 preferably includes rounded corner portions and ridgeline portions. The corner portion is a portion at which three adjacent surfaces of a laminated body intersect, and the ridgeline portion is a portion at which two adjacent surfaces of a laminated body intersect. In addition, irregularities or the like may be provided on all or a portion of the first main surface 12a and the second main surface 12b, the first side surface 12c and the second side surface 12d, and the first end surface 12e and the second end surface 12f. Furthermore, the dimension of the laminated body 12 in the length direction z is not necessarily longer than the dimension of the laminated body 12 in the width direction y.

The number of the ceramic layers 14 to be laminated is not particularly limited, but is preferably, for example, 15 or more and 200 or less (including an outer layer portion 15a to be described later).

The laminated body 12 includes the outer layer portion 15a including the plurality of ceramic layers 14 and an inner layer portion 15b including one or more of ceramic layers 14 and the plurality of internal electrode layers 16 disposed thereon. The outer layer portion 15a is located on the first main surface 12a side and the second main surface 12b side of the laminated body 12, and an assembly of the plurality of ceramic layers 14 located between the first main surface 12a and the internal electrode layer 16 closest to the first main surface 12a, and the plurality of ceramic layers 14 located between the second main surface 12b and the internal electrode layer 16 closest to the second main surface 12b. The region sandwiched by both outer layer portions 15a is the inner layer portion 15b. The thickness of the outer layer portion 15a is preferably about 10 µm or more and about 300 µm or less, for example.

The dimensions of the laminated body 12 are not particularly limited, but it is preferable that the dimension in the length direction z are, for example, about 0.90 mm or more and about 5.40 mm or less, the dimension in the width direction y is about 0.40 mm or more and about 4.92 mm or less, and the dimension in the lamination direction x is about 0.40 mm or more and about 2.96 mm or less, for example.

The ceramic layer 14 can be made of, for example, a dielectric material. For example, a dielectric ceramic including a component such as $BaTiO_3$, $CaTiO_3$, $SrTiO_3$, or $CaZrO_3$ can be used as the dielectric material. When the above-described dielectric material is included as a main component, the dielectric material to which a sub-component such as, for example, an Mn compound, an Fe compound, a Cr compound, a Co compound, or an Ni compound whose content is less than that of the main component is added according to characteristics of the desired laminated body 12 may be used.

When a piezoelectric ceramic is used for the laminated body 12, the multilayer ceramic electronic component defines and functions as a ceramic piezoelectric element. A specific example of the piezoelectric ceramic material includes, for example, a lead zirconate titanate (PZT)-based ceramic material.

When a semiconductor ceramic is used for the laminated body 12, the multilayer ceramic electronic component defines and functions as a thermistor element. A specific example of the semiconductor ceramic material includes, for example, a spinel ceramic material.

When a magnetic ceramic is used for the laminated body 12, the multilayer ceramic electronic component defines and functions as an inductor element. Further, when the multilayer ceramic electronic component defines and functions as an inductor element, the internal electrode layer 16 is a coiled conductor. A specific example of the magnetic ceramic material includes, for example, a ferrite ceramic material.

The thickness of the ceramic layer 14 after firing is preferably about 0.5 μm or more and about 20.0 μm or less, for example.

The laminated body 12 includes, as the plurality of internal electrode layers 16, for example, a plurality of first internal electrode layers 16a and a plurality of second internal electrode layers 16b having a rectangular or substantially rectangular shape. The plurality of first internal electrode layers 16a and the plurality of second internal electrode layers 16b are embedded alternately at equal or substantially equal intervals along the lamination direction x of the laminated body 12.

The first internal electrode layer 16a includes a first counter electrode portion 18a facing the second internal electrode layer 16b, and a first extended electrode portion 20a located at one end of the first internal electrode layer 16a and extended from the first counter electrode portion 18a to the first end surface 12e of the laminated body 12. An end portion of the first extended electrode portion 20a is extended to the first end surface 12e and exposed.

The second internal electrode layer 16b includes a second counter electrode portion 18b facing the first internal electrode layer 16a, and a second extended electrode portion 20b located at one end of the second internal electrode layer 16b and extended from the second counter electrode portion 18b to the second end surface 12f of the laminated body 12. An end portion of the second extended electrode portion 20b is extended to the second end surface 12f and exposed.

The shape of the first counter electrode portion 18a of the first internal electrode layer 16a and the shape of the second counter electrode portion 18b of the second internal electrode layer 16b are not particularly limited, but are preferably rectangular or substantially rectangular. The corner portion may be rounded, or the corner portion may be obliquely configured (tapered).

The shape of the first extended electrode portion 20a of the first internal electrode layer 16a and the shape of the second extended electrode portion 20b of the second internal electrode layer 16b are not particularly limited, but are preferably rectangular or substantially rectangular. The corner portion may be rounded, or the corner portion may be obliquely configured (tapered).

The first counter electrode portion 18a of the first internal electrode layer 16a and the first extended electrode portion 20a of the first internal electrode layer 16a may have the same or substantially the same width, or either one may have a narrower width. Similarly, the second counter electrode portion 18b of the second internal electrode layer 16b and the second extended electrode portion 20b of the second internal electrode layer 16b may have the same or substantially the same width, or either one may have a narrower width.

The laminated body 12 includes side portions (W gap) 22a of the laminated body 12 between one end of the first counter electrode portion 18a and one end of the second counter electrode portion 18b in the width direction y, and the first side surface 12c, and between the other end of the first counter electrode portion 18a and the other end of the second counter electrode portion 18b in the width direction y, and the second side surface 12d. Furthermore, the laminated body 12 includes end portions (L gap) 22b of the laminated body 12 between an end portion of the first internal electrode layer 16a opposite to the first extended electrode portion 20a and the second end surface 12f, and between an end portion of the second internal electrode layer 16b opposite to the second extended electrode portion 20b and the first end surface 12e.

The internal electrode layer 16 includes an appropriate conductive material such as an alloy including at least one of the metals such as Ni, Cu, Ag, Pd, and Au, for example, an Ag—Pd alloy. It is preferable that an ethyl cellulose and an acrylic resin be used as a resin component for an internal electrode conductive paste used for the internal electrode layer 16.

The thickness of the internal electrode layer 16 is preferably about 0.2 μm or more and about 2.0 μm or less, for example. The number of the internal electrode layers 16 is preferably 15 or more and 200 or less, for example.

An external electrode 24 is disposed on the first end surface 12e and the second end surface 12f of the laminated body 12. The external electrode 24 includes a first external electrode 24a and a second external electrode 24b.

The first external electrode 24a is disposed on the surface of the first end surface 12e of the laminated body 12, and extends from the first end surface 12e to cover a portion of each of the first main surface 12a, the second main surface 12b, the first side surface 12c, and the second side surface 12d. In this case, the first external electrode 24a is electrically connected to the first extended electrode portion 20a of the first internal electrode layer 16a. The first external electrode 24a may be provided only on the first end surface 12e of the laminated body 12.

The second external electrode 24b is disposed on the surface of the second end surface 12f of the laminated body 12, and extends from the second end surface 12f to cover a portion of each of the first main surface 12a, the second main surface 12b, the first side surface 12c, and the second side surface 12d. In this case, the second external electrode 24b is electrically connected to the second extended electrode portion 20b of the second internal electrode layer 16b. The second external electrode 24b may be provided only on the second end surface 12f of the laminated body 12.

In the laminated body 12, the first counter electrode portion 18a of the first internal electrode layer 16a and the second counter electrode portion 18b of the second internal electrode layer 16b face each other with the ceramic layer 14 interposed therebetween, so that a capacitor is defined. Therefore, electrostatic capacitance can be obtained between the first external electrode 24a to which the first internal electrode layer 16a is connected and the second external electrode 24b to which the second internal electrode layer 16b is connected, and the characteristics of the capacitor can be provided.

Figure 5A:
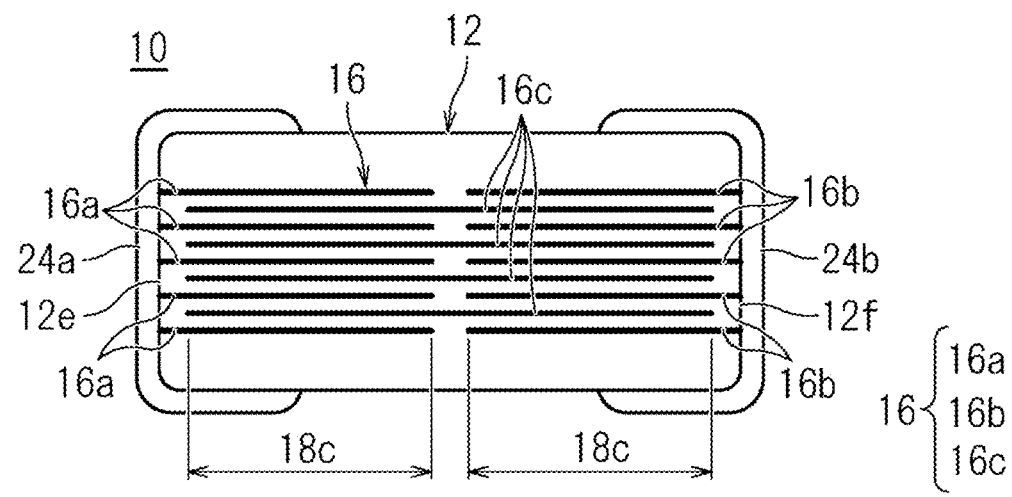
FIG. 5A is a cross-section view taken along line II-II of FIG. 1 showing a structure in which a counter electrode portion of an internal electrode layer of a multilayer ceramic capacitor according to a preferred embodiment of the present invention is divided into two.
Figure 5B:
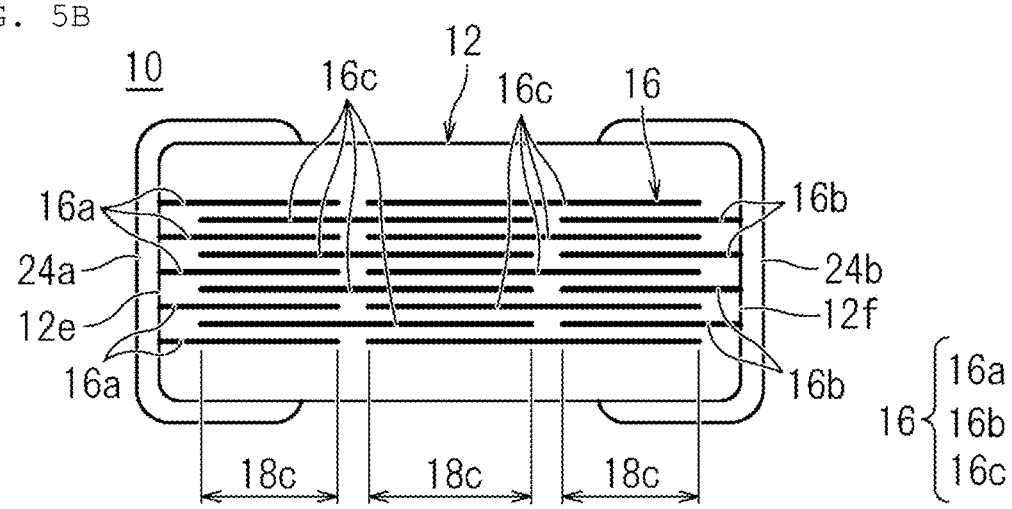
FIG. 5B is a cross-section view taken along line II-II of FIG. 1 showing a structure in which the counter electrode portion of the internal electrode layer of a multilayer ceramic capacitor according to a preferred embodiment of the present invention is divided into three.
Figure 5C:
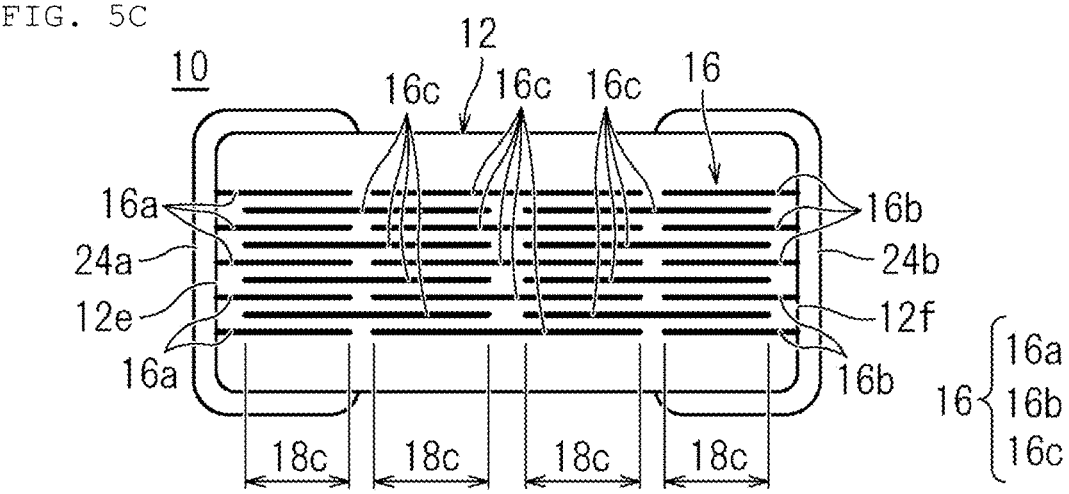
FIG. 5C is a cross-section view taken along line II-II of FIG. 1, showing a structure in which the counter electrode portion of the internal electrode layer of a multilayer ceramic capacitor according to a preferred embodiment of the present invention is divided into four.

As shown in FIG. 5, the internal electrode layer 16 may include, in addition to the first internal electrode layer 16a and the second internal electrode layer 16b, a floating internal electrode layer 16c which is extended to neither the first end surface 12e nor the second end surface 12f, and a counter electrode portion 18c may be divided into a plurality of portions by the floating internal electrode layer 16c. For example, the structure may be a double structure as shown in FIG. 5A, a triple structure as shown in FIG. 5B, and a quadruple structure as shown in FIG. 5C, and the structure may be more than the quadruple structure. As described above, by dividing the counter electrode portion 18c into a plurality of divided portions, a plurality of capacitor components are provided between the facing internal electrode layers 16a, 16b, and 16c, and these capacitor components are connected to each other in series. Therefore, the voltage applied to each capacitor component is low, and the breakdown voltage of the multilayer ceramic capacitor can be increased.

The first external electrode 24a and the second external electrode 24b include a base electrode layer 26 including a conductive metal and a glass component, a conductive resin layer 28 including a thermosetting resin and a metal component covering the base electrode layer 26, and a plating layer 30 covering the conductive resin layer 28.

The base electrode layer 26 includes a first base electrode layer 26a and a second base electrode layer 26b.

The first base electrode layer 26a is disposed on the surface of the first end surface 12e of the laminated body 12, and extends from the first end surface 12e to cover a portion of each of the first main surface 12a, the second main surface 12b, the first side surface 12c, and the second side surface 12d.

The second base electrode layer 26b is disposed on the surface of the second end surface 12f of the laminated body 12 and extends from the second end surface 12f to cover a portion of each of the first main surface 12a, the second main surface 12b, the first side surface 12c, and the second side surface 12d.

The first base electrode layer 26a may be disposed only on the surface of the first end surface 12e of the laminated body 12, and the second base electrode layer 26b may be disposed only on the surface of the second end surface 12f of the laminated body 12.

The base electrode layer 26 includes at least one selected from a baked layer, a plating layer, a thin film layer, and the like, for example.

First, the first base electrode layer 26a and the second base electrode layer 26b in which the base electrode layer 26 is defined by the baked layer will be described.

The baked layer preferably includes glass and metal. The metal of the baked layer preferably includes, for example, at least one selected from Cu, Ni, Ag, Pd, an Ag—Pd alloy, Au and the like. The glass of the baked layer preferably includes, for example, at least one selected from B, Si, Ba, Mg, Al, Li and the like. The baked layer may include multiple layers. The baked layer is obtained by applying a conductive paste including glass and metal to the laminated body 12 and baking it, and may be fired simultaneously with the ceramic layer 14 and the internal electrode layer 16, or may be baked after firing the ceramic layer 14 and the internal electrode layer 16. When the ceramic layer 14 and the internal electrode layer 16 are simultaneously fired, it is preferable to use a ceramic material of the same type as the ceramic layer 14, instead of glass.

The thickness of each of the baked layers at the central portions of the base electrode layer 26 in a height direction located at the first end surface 12e and the second end surface 12f is preferably 10 µm or more and 260 µm or less.

Further, when the base electrode layer is provided on the surfaces of the first main surface 12a and the second main surface 12b, and the first side surface 12c and the second side surface 12d, the thickness of each of the baked layers at the central portions of the first base electrode layer and the second base electrode layer in the length direction located on the surfaces of the first main surface 12a and the second main surface 12b, and the first side surface 12c and the second side surface 12d is preferably about 3 µm or more and about 60 µm or less, for example.

Next, the first base electrode layer and the second base electrode layer in which the base electrode layer 26 is defined by the plating layer will be described.

The plating layer preferably includes a lower layer plating electrode provided on the surface of the laminated body 12 and an upper layer plating electrode provided on the surface of the lower layer plating electrode. Each of the lower layer plating electrode and the upper layer plating electrode preferably includes, for example, at least one metal selected from Cu, Ni, Sn, Pb, Au, Ag, Pd, Bi, Zn or the like or an alloy including the metal.

The lower layer plating electrode is preferably made of Ni having solder barrier performance, and the upper layer plating electrode is preferably made of Sn or Au having good solder wettability, for example.

Also, for example, when the first internal electrode layer 16a and the second internal electrode layer 16b are made of Ni, it is preferable that the lower layer plating electrode is made of Cu, which has a good bonding property with Ni. The upper layer plating electrode may be provided as necessary, and the first external electrode 24a and the second external electrode 24b may include only the lower layer plating electrode. In the case where the base electrode layer 26 is a plating layer, the upper layer plating electrode may be the outermost layer of the plating layer, or another plating electrode may be provided on the surface of the upper layer plating electrode. It is preferable that the thickness per one layer of the plating layer disposed without providing the base electrode layer 26 is about 1 µm or more and about 15 µm or less, for example. The plating layer preferably does not include glass. It is preferable that the metal ratio of a plating layer per unit volume is about 99 vol % or more, for example.

When the base electrode layer is a thin film layer, the thin film layer is formed by a thin film forming method such as a sputtering method or a vapor deposition method, for example, and is preferably, for example, a layer of about 1 µm or less in which metal grains are deposited.

The conductive resin layer 28 includes a first conductive resin layer 28a and a second conductive resin layer 28b.

The first conductive resin layer 28a covers the surface of the first base electrode layer 26a and a portion of each of the first main surface 12a, the second main surface 12b, the first side surface 12c, and the second side surface 12d.

The second conductive resin layer 28b covers the surface of the second base electrode layer 26b and a portion of each of the first main surface 12a, the second main surface 12b, the first side surface 12c, and the second side surface 12d.

The first conductive resin layer 28a includes a first layer 32a located on the surface of the first base electrode layer 26a, and a second layer 34a located on the surface of the first layer 32a, and a third layer 36a located on the surface of the first second layer 34a. More specifically, the first layer 32a preferably covers the first base electrode layer 26a, and the second layer 34a preferably covers the first layer 32a, and the third layer 36a preferably covers the second layer 34a. However, the electrode films of the first layer 32a, the second layer 34a and the third layer 36a may be disconnected at the corner portions of the laminated body 12.

The second conductive resin layer 28b includes the first layer 32b located on the surface of the second base electrode layer 26b, the second layer 34b located on the surface of the first layer 32b, and the third layer 36b located on the surface of the second layer 34b. More specifically, the first layer 32b preferably covers the second base electrode layer 26b, the second layer 34b preferably covers the first layer 32b, and the third layer 36b preferably covers the second layer 34b. However, the electrode films of the first layer 32b, the second layer 34b, and the third layer 36b may be disconnected at the corner portions of the laminated body 12.

Preferably, the first layer 32a and the first layer 32b, and the third layer 36a and the third layer 36b have void volumes determined by the following Equation (1) of about 10 vol % or less, and the second layer 34a and the second layer 34b have the void volumes determined by the following Equation (1) of about 16 vol % or more.

Equation 1

$$\text{Void volume (vol \%)} = (a-b-c)/a \times 100 \quad (1)$$

a: Measured film thickness (physical thickness)
b: Metal film thickness (fluorescent X-ray film thickness)
c: Theoretical resin film thickness calculated from b (calculated from PVC)

As a result, even if deflection stress is applied to a substrate, the void volume in the second layers 34a and 34b of the conductive resin layer is large, and cohesive force is low, so that fracture cracks due to the deflection stress are generated and developed in the second layers 34a and 34b of the conductive resin layer before the fracture cracks are generated in the laminated body 12, and the deflection stress applied to the multilayer ceramic capacitor 10 can be released. As a result, the generation of the crack in the laminated body 12 can be reduced or prevented.

When the void volume in the second layers 34a and 34b of the conductive resin layer is smaller than about 16 vol %, the cohesive force of the second layers 34a and 34b of the conductive resin layer is high, so that the stress cannot be released sufficiently, it is impossible to stably provide the fail-safe function, and when the substrate deflection stress is applied, the crack may be generated in the laminated body 12.

In addition, the void volume in the second layers 34a and 34b of the conductive resin layer is preferably about 30 vol % or less, for example. When the void volume in the second layers 34a and 34b of the conductive resin layer is larger than about 30 vol %, the film has many voids, so that the conductive passage is discontinuous, the conductivity of the conductive resin layer 28 decreases, and the ESR increases.

Furthermore, due to the presence of the first layers 32a and 32b of the conductive resin layer, the development of the fracture cracks generated in the second layers 34a and 34b of the conductive resin layer can be reduced or prevented from being bent to the laminated body 12 side (that is, developing to the laminated body side). Therefore, when the deflection stress is applied, it is possible to stably select the development destination of the fracture crack of the conductive resin layer 28 toward the second layers 34a and 34b of the conductive resin layer, and it is possible to stably reduce or prevent the generation of the fracture crack in the laminated body 12.

When the void volume in the first layers 32a and 32b of the conductive resin layer is larger than about 10 vol %, the cohesive force of the first layers 32a and 32b of the conductive resin layer is low, so that the fracture crack due to the stress of the substrate deflection generated in the second layers 34a and 34b of the conductive resin layer also develops to the first layers 32a and 32b of the conductive resin layer. As a result, the development of the fracture crack is bent to the laminated body 12 side (developing to the laminated body side), the stability of the fail-safe function is lost, and the laminated body 12 may be cracked.

Furthermore, the presence of the third layers 36a and 36b of the conductive resin layer can protect the second layers 34a and 34b of the conductive resin layer, and it is possible to stably maintain the state of the low cohesive force of the second layers 34a and 34b of the conductive resin layer.

When the void volume in the third layers 36a and 36b of the conductive resin layer is larger than about 10 vol %, the voids of the third layers 36a and 36b of the conductive resin layer increase, and the infiltration path of moisture such as a plating solution is easy to be generated. As a result, moisture such as a plating solution easily infiltrates from the third layers 36a and 36b of the conductive resin layer, resulting in the infiltration of moisture such as a plating solution to the second layers 34a and 34b of the conductive resin layer which are required to keep the cohesive force low. As a result, it is impossible to keep the cohesive force of the second layers 34a and 34b of the conductive resin layer low, so that when the deflection stress is applied to a mounting substrate on which the multilayer ceramic electronic component is mounted, the sufficient stress relaxation by the fracture development in the second layers 34a and 34b of the conductive resin layer is not obtained (that is, the fail-safe function is not provided), and the laminated body 12 is cracked.

Next, the measured film thickness (physical thickness) a, the metal film thickness (fluorescent X-ray film thickness) b, and the theoretical resin film thickness c calculated from the metal film thickness (fluorescent X-ray film thickness) b in Equation (1) will be described.

Figure 6:
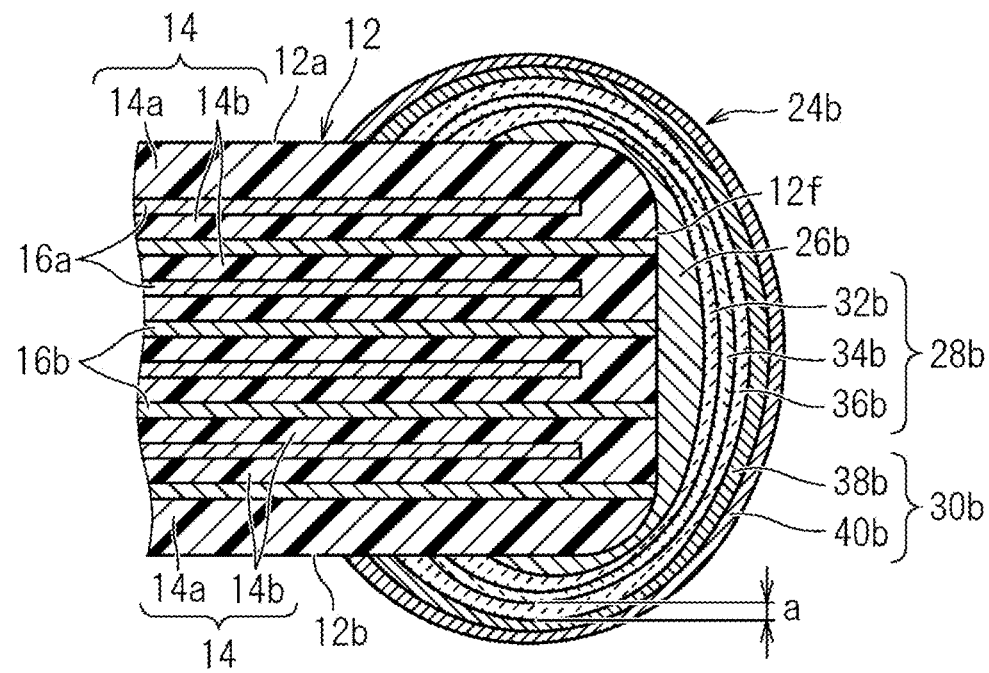
FIG. 6 is an explanatory view showing a range in which a measured film thickness (physical thickness) of a conductive resin layer is measured, and shows the case of a third layer.

The measured film thickness (physical thickness) a is, as shown in FIG. 6, the thickness of each of the first layers 32a and 32b, the second layers 34a and 34b, and the third layers 36a and 36b of the conductive resin layer 28 located on the main surfaces 12a and 12b or the side surfaces 12c and 12d of the laminated body 12. In FIG. 6, the measured film thickness (physical thickness) a in the third layers 36a and 36b is shown as an example. In the method of measuring the measured film thickness (physical thickness) a, the multilayer ceramic capacitor 10 is polished along the first side surface 12c or the second side surface 12d up to about a half length (that is, about ½ W) of the length in the direction connecting the first side surface 12c and the second side surface 12d vertically with respect to either of the first side surface 12c or the second side surface 12d of the multilayer ceramic capacitor 10. Thereafter, in the polished cross-section, the dimensions of the first layers 32a and 32b, the second layers 34a and 34b, and the third layers 36a and 36b at the thickest point of the conductive resin layer 28 on the first side surface 12c, the second side surface 12d or the first main surface 12a, and the second main surface 12b are obtained from the cross-section image.

Figure 7:
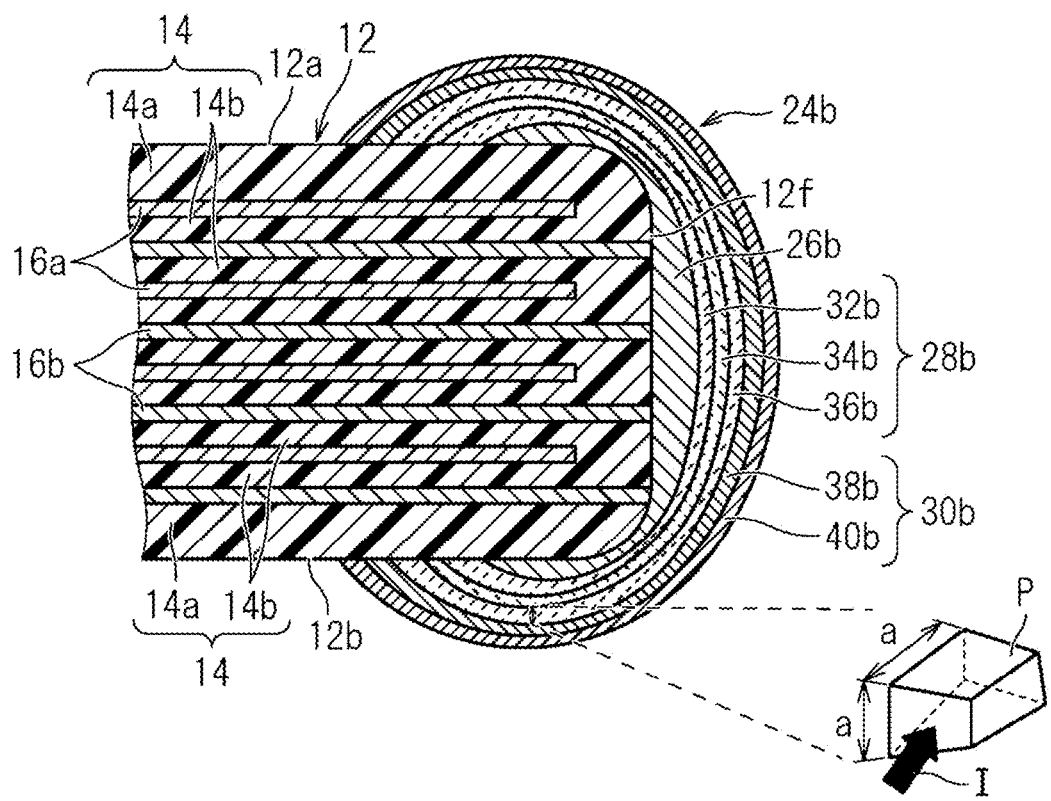
FIG. 7 is an explanatory view showing a method of measuring a metal film thickness (fluorescent X-ray film thickness) of the conductive resin layer, and shows the case of the third layer.

As shown in FIG. 7, the metal film thickness (fluorescent X-ray film thickness) b indicates a value obtained by converting, to a thickness, the total fluorescent X-ray intensity of only the metal component in the conductive resin layer 28 where the intensity is measured using fluorescent X-rays. In the method of measuring the metal film thickness (fluorescent X-ray film thickness) b, a conductive resin piece P defined by "the measured film thickness a x the width with the same length as the measured film thickness a" at the point where the measured film thickness (physical thickness) a has been measured is cut out, and fluorescent X-rays are emitted from a direction I perpendicular or substantially perpendicular to a direction in which the measured film thickness (physical thickness) a has been measured using the fluorescent X-ray measurement apparatus (SFT9400 manufactured by Hitachi High-Tech Science Corporation). Thereafter, the fluorescent X-ray intensity of the metal component positioned on a straight line with respect to the measured film thickness direction is obtained, and the value obtained by converting the result to a thickness is regarded as the metal film thickness (fluorescent X-ray film thickness) b. In addition, in FIG. 7, the method of measuring the thickness of the metal film thickness (fluorescent X-ray film thickness) b in the third layers 36a and 36b is shown as an example.

The PVC shows the volume ratio of metal powder/(metal powder+resin) among metal powder and resin included in each layer of the conductive resin layers. That is, it is an index showing how much the inorganic component occupies in the volume in the dried film. The theoretical resin film thickness c is calculated by performing TG-DTA in an air atmosphere on the conductive resin piece P obtained for measurement of the metal film thickness (fluorescent X-ray film thickness) b and by measuring the weight loss at a temperature of room temperature or more and about 900° C. or less. Since the weight loss corresponds to the resin component in the conductive resin layer, the volume ratio is calculated from the specific gravity of the metal component and the specific gravity of the resin component (which is one for convenience) to determine the PVC.

Here, the theoretical resin film thickness c is calculated from the PVC. The amount of resin contained in the film thickness of each layer of the conductive resin layers is shown. For example, in the case of the PVC=about 50% and the metal film thickness b=about 10 μm, the theoretical resin film thickness c is about 10/0.5-10=about 10 μm. Based on this calculation method, the theoretical resin film thickness c calculated from the metal film thickness (fluorescent X-ray film thickness) b is defined.

The void film thickness indicates the total film thickness of the voids in each layer of the conductive resin layers at the point where the measured film thickness (physical thickness) a is measured, and the void film thickness is calculated by a-b-c.

Figure 8:
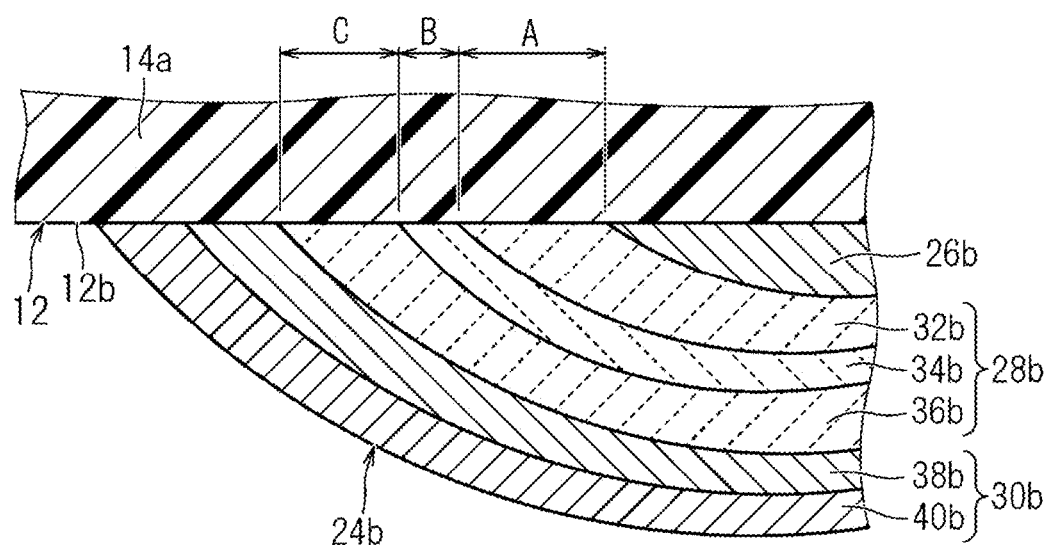
FIG. 8 is an explanatory view showing a range for defining Dimension A, Dimension B, and Dimension C in the conductive resin layer.

Furthermore, as shown in FIG. 8, the multilayer ceramic capacitor 10 according to the present preferred embodiment has a feature in which when the length of the first layers 32a and 32b in contact with a portion of the first main surface 12a and the second main surface 12b and a portion of the first side surface 12c and the second side surface 12d is denoted as Dimension A, the length of the second layers 34a and 34b in contact with a portion of the first main surface 12a and the second main surface 12b, and a portion of the first side surface 12c and the second side surface 12d is denoted as Dimension B, and the length of the third layers 36a and 36b in contact with a portion of the first main surface 12a and the second main surface 12b and a portion of the first side surface 12c and the second side surface 12d is denoted as Dimension C, a relationship of Dimension A:Dimension B:Dimension C=15 to about 70:10 to about 65:10 to 65 is satisfied (where the ratio of Dimension A+the ratio of Dimension B+the ratio of Dimension C=100).

Thus, even if a deflection stress is applied to the substrate, the fracture crack due to the deflection stress is generated and developed in the second layers 34a and 34b of the conductive resin layer before it is generated in the laminated body 12, so that it is possible to release the deflection stress applied to the laminated body 12 and to reduce or prevent the generation of cracks in the laminated body 12.

Further, when the ratio of Dimension B of the second layers 34a and 34b of the conductive resin layer is smaller than about 10, the dimensions of the second layers 34a and 34b of the conductive resin layer located on the first main surface 12a and the second main surface 12b and on the first side surface 12c and the second side surface 12d are reduced, and it is not possible to generate the sufficient fracture crack to release the stress in the second layers 34a and 34b of the conductive resin layer, so that the fail-safe function due to the development of the fracture of the second layers 34a and 34b of the conductive resin layer cannot be stably provided. As a result, when a deflection stress is applied to the substrate, the crack is generated in the laminated body 12.

On the other hand, when the ratio of Dimension B of the second layers 34a and 34b of the conductive resin layer is greater than about 65, Dimension B of the second layers 34a and 34b located on the first main surface 12a and the second main surface 12b and on the first side surface 12c and the second side surface 12d is long, and the ratio is below the lower limit of the dimension ratio required for the first layers 32a and 32b or the third layers 36a and 36b of the conductive resin layer, so that it is difficult to provide the original function of the first layers 32a and 32b and the third layers 36a and 36b of the conductive resin layer.

When the ratio of Dimension A of the first layers 32a and 32b is smaller than about 15, it is difficult to provide the function of the first layers 32a and 32b of the conductive resin layer, and the fracture crack due to the stress of the substrate deflection generated in the second layers 34a and 34b of the conductive resin layer also develops at the first layers 32a and 32b of the conductive resin layer. As a result, the fracture crack may be bent to the laminated body 12 side (developing to the laminated body 12 side), the stability of the fail-safe function may be lost, and the laminated body 12 may be cracked.

On the other hand, when the ratio of Dimension A of the first layers 32a and 32b of the conductive resin layer is greater than about 70, Dimension A of the first layers 32a and 32b of the conductive resin layer located on the first main surface 12a and the second main surface 12b and on the first side surface 12c and the second side surface 12d is long, and the ratio is below the lower limit of the dimension ratio required for the second layers 34a and 34b or the third layers 36a and 36b of the conductive resin layer, so that it is difficult to provide the original function of the second layers 34a and 34b and the third layers 36a and 36b of the conductive resin layer.

Further, when the ratio of Dimension C of the third layers 36a and 36b of the conductive resin layer is smaller than about 10, Dimension C of the third layers 36a and 36b of the conductive resin layer located on the first main surface 12a and the second main surface 12b and on the first side surface 12c and the second side surface 12d is short, and moisture such as a plating solution may pass through the third layers 36a and 36b of the conductive resin layer to infiltrate into the second layers 34a and 34b of the conductive resin layer, so that it is difficult to ensure sufficient sealing performance of the second layers 34a and 34b of the conductive resin layer, which is a function of the third layers 36a and 36b of the conductive resin layer. Therefore, moisture such as a plating solution easily infiltrates from the third layers 36a and 36b of the conductive resin layer, leading to the infiltration of moisture such as a plating solution into the second layers 34a and 34b of the conductive resin layer which are required to have the low cohesive force. As a result, it is difficult to keep the cohesive force of the second layers 34a and 34b of the conductive resin layer low, so that when the deflection stress is applied to the mounting substrate on which the multilayer ceramic capacitor of the present preferred embodiment is mounted, the sufficient stress relaxation by the fracture development in the second layers 34a and 34b of the conductive resin layer may not be obtained (that is, the fail-safe function is not provided), and the laminated body 12 may be cracked.

Furthermore, when the ratio of Dimension C of the third layers 36a and 36b of the conductive resin layer is greater than about 65, Dimension C of the third layers 36a and 36b of the conductive resin layer located on the first main surface 12a and the second main surface 12b, and on the first side surface 12c and the second side surface 12d is long, so that it is difficult to ensure sufficient dimensions of the first layers 32a and 32b of the conductive resin layer, and the second layers 34a and 34b of the conductive resin layer located on the first main surface 12a and the second main surface 12b and on the first side surface 12c and the second side surface 12d. Therefore, since the ratio is less than the lower limit of the dimension ratio required for the first layers 32a and 32b or the second layers 34a and 34b of the conductive resin layer, it is difficult to provide the original function of the first layers 32a and 32b and the second layers 34a and 34b of the conductive resin layer.

Next, a method of measuring the dimension ratios of the first layers 32a and 32b, the second layers 34a and 34b, and the third layers 36a and 36b of the conductive resin layer 28 will be described.

The multilayer ceramic capacitor 10 is polished along the first side surface 12c or the second side surface 12d up to a half length (½ W) of the length in the direction connecting the first side surface 12c and the second side surface 12d vertically with respect to either of the first side surface 12c or the second side surface 12d of the multilayer ceramic capacitor 10. After that, in the polished cross-section, the dimension of the first layers 32a and 32b of the conductive resin layer 28 in contact with the first main surface 12a and the second main surface 12b in the length direction z in which the first end surface 12e and the second end surface 12f are connected is measured and denoted as Dimension A, the dimension of the second layers 34a and 34b of the conductive resin layer 28 in contact with the first main surface 12a and the second main surface 12b in the length direction z in which the first end surface 12e and the second end surface 12f are connected is measured and denoted as Dimension B, and the dimension of the third layers 36a and 36b of the conductive resin layer 28 in contact with the first main surface 12a and the second main surface 12b in the length direction z in which the first end surface 12e and the second end surface 12f are connected is measured and denoted as Dimension C. Then, the sum of Dimensions A, B and C is defined as 100, and the dimension ratio of each layer is calculated.

The thicknesses of the first conductive resin layer 28a and the second conductive resin layer 28b at the central portions of the first conductive resin layer 28a located on the first end surface 12e and the second conductive resin layer 28b located on the second end surface 12f in the height direction are preferably about 10 μm or more and about 200 μm or less, for example, and the thicknesses of the first conductive resin layer 28a and the second conductive resin layer 28b at the central portions of the first conductive resin layer 28a and the second conductive resin layer 28b in the length direction z located on the first main surface 12a and the second main surface 12b, and on the first side surface 12c and the second side surface 12d are preferably about 3 μm or more and about 60 μm or less, for example.

The conductive resin layer 28 includes a thermosetting resin and a metal. Since the conductive resin layer 28 includes a thermosetting resin, the conductive resin layer 28 is more flexible than a conductive layer made of, for example, a plated film or a fired product of a conductive paste. Therefore, even when the multilayer ceramic capacitor is subjected to a physical impact or an impact due to a thermal cycle, the conductive resin layer 28 defines and functions as a buffer layer to reduce or prevent cracks in the multilayer ceramic capacitor.

Ag, Cu, or an alloy thereof can be used as a metal included in the conductive resin layer 28. In addition, an Ag coated metal on the surface of metal powder can be used. When an Ag coated metal is used on the surface of metal powder, it is preferable to use Cu or Ni as the metal powder. In addition, it is also possible to use Cu that has been subjected to an antioxidant treatment. In particular, it is preferable to use a conductive metal powder of Ag as the metal included in the conductive resin layer 28 since it is suitable as an electrode material because Ag is the lowest in resistivity among metals, and Ag is not oxidized and has a high weather resistance because it is a noble metal. It is preferable to use an Ag coated metal as the metal included in the conductive resin layer 28 because the metal of the base material can be made inexpensively while maintaining the characteristics of Ag described above.

In addition, the metal included in a conductive resin layer may include metal powder of one type, or may include metal powder of multiple types, for example, metal powder made of a first metal component and a second metal component.

The first metal component is preferably made of, for example, Sn, In, Bi, or an alloy including at least one of these metals. Among them, the first metal component is more preferably made of Sn or an alloy containing Sn. Specific examples of the alloy including Sn include, for example, Sn—Ag, Sn—Bi, Sn—Ag—Cu and the like.

The second metal component is made of, for example, a metal such as Cu, Ag, Pd, Pt, or Au or an alloy containing at least one of these metals. Among these, the second metal component is preferably made of Cu or Ag.

The metal included in the conductive resin layer 28 mainly provides the conductivity in the conductive resin layer 28. Specifically, when the conductive fillers come into contact with each other, a current passage is provided inside the conductive resin layer 28.

Various known thermosetting resins such as, for example, an epoxy resin, a phenol resin, a urethane resin, a silicone resin, and a polyimide resin can be used as the resin of the conductive resin layer 28. Among these, the epoxy resin having excellent heat resistance, moisture resistance, adhesion and the like is one of the most preferable resins.

Further, the conductive resin layer 28 preferably includes a curing agent together with the thermosetting resin. When an epoxy resin is used as the base resin, various publicly known compounds, such as phenol type, amine type, acid anhydride type and imidazole type, for example, can be used as a curing agent for the epoxy resin.

The plating layer 30 includes a first plating layer 30a and a second plating layer 30b. The plating layer 30 covers the conductive resin layer 28.

Specifically, it is preferable that the first plating layer 30a is disposed on the first end surface 12e on the first conductive resin layer 28a, and is provided so as to extend to the first main surface 12a, the second main surface 12b, the first side surface 12c, and the second side surface 12d of the first conductive resin layer 28a. The first plating layer 30a may be disposed only on the first end surface 12e on the first conductive resin layer 28a.

It is preferable that the second plating layer 30b is disposed on the second end surface 12f on the second conductive resin layer 28b, and is provided so as to extend to the first main surface 12a, the second main surface 12b, the first side surface 12c, and the second side surface 12d of the second conductive resin layer 28b. The second plating layer 30b may be disposed only on the second end surface 12f on the second conductive resin layer 28b.

The plating layer 30 preferably includes, for example, at least one selected from Cu, Ni, Sn, Ag, Pd, an Ag—Pd alloy, Au, and the like.

The plating layer 30 may include multiple layers. In this case, the plating layer preferably has a two-layer structure of an Ni plating layer and an Sn plating layer, for example.

That is, the first plating layer 30a includes a first Ni plating layer 38a and a first Sn plating layer 40a located on the surface of the first Ni plating layer 38a.

The second plating layer 30b includes a second Ni plating layer 38b and a second Sn plating layer 40b located on the surface of the second Ni plating layer 38b.

The Ni plating layers 38a and 38b cover the surfaces of the conductive resin layers 28a and 28b, thus providing solder barrier performance. In addition, by providing the Sn plating layers 40a and 40b on the surfaces of the Ni plating layers 38a and 38b, the solder wettability can be improved, and the mounting can be facilitated.

The thickness per one layer of the first plating layer 30a at the central portion of the first plating layer 30a in the height direction located at the first end surface 12e, and the thickness per one layer of the second plating layer 30b at the central portion of the second plating layer 30b in the height direction located at the second end surface 12f are preferably 1 µm or more and 15 µm or less, for example.

In addition, the thickness of the first plating layer 30a at the central portion of the first plating layer 30a in the length direction z located on the first main surface 12a and the second main surface 12b, and on the first side surface 12c and the second side surface 12d, and the thickness of the second plating layer 30b at the central portion of the second plating layer 30b in the length direction z located on the first main surface 12a and the second main surface 12b, and on the first side surface 12c and the second side surface 12d are preferably about 1 µm or more and about 15 µm or less, for example.

The dimension of the multilayer ceramic capacitor 10 in the length direction z including the laminated body 12, the first external electrode 24a and the second external electrode 24b is denoted as Dimension L, the dimension of the multilayer ceramic capacitor 10 in the lamination direction x including the laminated body 12, the first external electrode 24a and the second external electrode 24b is denoted as Dimension T, the dimension of the multilayer ceramic capacitor 10 in the width direction y including the laminated body 12, the first external electrode 24a and the second external electrode 24b is denoted as Dimension W.

For the dimensions of the multilayer ceramic capacitor 10, it is preferable that, for example, Dimension L in the length direction z is about 1.0 mm or more and about 5.6 mm or less, Dimension W in the width direction y is about 0.5 mm or more and about 5.1 mm or less, and Dimension T in the lamination direction x is about 0.5 mm or more and about 3.2 mm or less.

In the multilayer ceramic capacitor 10 shown in FIG. 1, the conductive resin layer 28 includes the first layers 32a and 32b located on the base electrode layers 26a and 26b, the second layers 34a and 34b located on the first layers 32a and 32b, and the third layers 36a and 36b located on the second layers 34a and 34b. With respect to the first layers 32a and 32b and the third layers 36a and 36b, the void volume determined by Equation (1) is about 10 vol % or less, with respect to the second layers 34a and 34b, the void volume determined by Equation (1) is about 16 vol % or more, and when the length of the first layers 32a and 32b in contact with a portion of the first and second main surfaces 12a and 12b, and the first and second side surfaces 12c and 12d is denoted as Dimension A, the length of the second layers 34a and 34b in contact with the first and second main surfaces 12a and 12b, and a portion of the first and second side surfaces 12c and 12d is denoted as Dimension B, the length of the third layers 36a and 36b in contact with a portion of the first and second main surfaces 12a and 12b, and a portion of the first and second side surfaces 12c and 12d is denoted as Dimension C, the ratio between Dimension A, Dimension B, and Dimension C is Dimension A:Dimension B:Dimension C=about 15 or more and about 70 or less:about 10 or more and about 65 or less:about 10 or more and about 65 or less (where a ratio of Dimension A+a ratio of Dimension B+a ratio of Dimension C=100), for example, so that even if the substrate stress is applied to the mounting substrate on which the multilayer ceramic electronic component is mounted, it is possible to stably select the development destination of the fracture crack during the deflection test toward the conductive resin layer, and it is possible to reduce or prevent the fracture crack being generated into the laminated body.

In addition, the mechanism mentioned above is presumed as follows.

That is, since the void volume in the second layers 34a and 34b of the conductive resin layer is increased to lower the cohesive force, the fracture crack develops in the second layers 34a and 34b of the conductive resin layer before the laminated body 12 is fractured when the substrate stress is applied, so that generation of the fracture crack in the laminated body 12 can be reduced or prevented. The second layers 34a and 34b of the conductive resin layer have a small void volume, and the first layers 32a and 32b of the conductive resin layer in a state of high cohesive force are present, so that it is possible to reduce or prevent the development of the fracture crack generated in the second layers 34a and 34b of the conductive resin layer from being bent to the laminated body 12 side (developing to the laminated body side). In addition to the small void volume in the second layers 34a and 34b of the conductive resin layer, the presence of the third layers 36a and 36b of the conductive resin layer capable of reducing or preventing the infiltration of moisture such as a plating solution can protect the second layers 34a and 34b of the conductive resin layer, and the state of releasing the substrate stress can be stably maintained in the development of the fracture crack.

Further, when the first layers 32a and 32b, the second layers 34a and 34b, and the third layers 36a and 36b of the conductive resin layer have overly thin film thicknesses located at least on the first and second main surfaces 12a and 12b and on the first and second side surfaces 12c and 12d, it is difficult to provide the above function of each layer. The function of each layer can be stably provided by having a film thickness that ensures the conditions defined by Dimension A, Dimension B, and Dimension C.

As a result, it is possible to stabilize the fail-safe function against the substrate bending stress, and it is possible to achieve both the mountability and the conductivity required for the external electrode 24 of the multilayer ceramic capacitor 10.

Further, in the multilayer ceramic capacitor 10 shown in FIG. 1, the conductive passage in the conductive resin layer 28 can be secured when the void volume in the second layers 34a and 34b of the conductive resin layer is about 30 vol % or less, for example, so that a relatively low ESR is maintained.

Furthermore, in the multilayer ceramic capacitor 10 shown in FIG. 1, when the base electrode layer 26 includes a glass component, the glass component acts as an adhesive between the laminated body 12 and the base electrode layer 26, and functions to completely seal the space which is not filled with a metal, so that the moisture resistance is improved.

2. Method of Manufacturing Multilayer Ceramic Capacitor

Next, a non-limiting example of a method of manufacturing a multilayer ceramic capacitor which is a multilayer ceramic electronic component according to a preferred embodiment of the present invention will be described.

First, a laminated body including a first internal electrode layer and a second internal electrode layer is prepared.

Specifically, first, a ceramic green sheet is produced by applying a ceramic paste containing a ceramic powder in a sheet form by, for example, a screen printing method and drying it.

Next, a conductive paste that forms an internal electrode is applied to the ceramic green sheet in a predetermined pattern by, for example, a screen printing method or a gravure printing method to prepare a ceramic green sheet on which an internal electrode formation conductive pattern is formed and a ceramic green sheet on which the internal electrode formation conductive pattern is not formed. The ceramic paste and the conductive paste that forms the internal electrode preferably include, for example, a binder and a solvent, which may be a publicly known organic binder and a publicly known organic solvent.

Subsequently, a predetermined number of ceramic green sheets to form the outer layer on which the internal electrode formation conductive pattern is not formed are laminated, and ceramic green sheets on which the internal electrode formation conductive pattern is formed are sequentially laminated thereon, and a predetermined number of ceramic green sheets on which the internal electrode formation conductive pattern is not formed are laminated to produce a mother laminated body.

If necessary, the mother laminated body may be bonded in the lamination direction by, for example, an isostatic press.

Thereafter, the mother laminated body is cut into a predetermined shape and size, and a raw laminated body chip is cut out. At this time, barrel polishing or the like may be performed on the raw laminated body chip to round the corner portions and ridgeline portions of the laminated body.

Subsequently, the cut raw laminated body chip is fired, the first internal electrode layer and the second internal electrode layer are disposed inside the laminated body, and a laminated body in which the first internal electrode layer is extended to the first end surface, and the second internal electrode layer is extended to the second end surface is produced. The firing temperature of the raw laminated body chip depends on the material of the ceramic and the material of the conductive paste for internal electrode formation, but is preferably about 900° C. or more and about 1300° C. or less, for example.

Next, a base electrode layer is formed. First, an external electrode conductive paste is applied to both end surfaces of the laminated body chip after firing, and is baked to form a first base electrode layer of a first external electrode and a second base electrode layer of a second external electrode. The baking temperature is preferably about 700° C. or more and about 900° C. or less, for example.

Thereafter, a conductive resin paste including a thermosetting resin and a metal component is applied to cover the surface of the base electrode layer composed of the baked layer, heat treatment is preferably performed at a temperature of about 180° C. or more and about 550° C. or less, for example, and the resin is thermally cured to form a conductive resin layer. The atmosphere during the heat treatment at this time is preferably an $N_2$ atmosphere, for example. Moreover, the oxygen concentration is preferably about 100 ppm or less, for example, in order to reduce or prevent scattering of resin and to reduce or prevent oxidation of various metal components.

More specifically, first, the conductive resin paste for a first layer of the conductive resin layer is applied onto the base electrode layer, and the heat treatment is performed preferably at a temperature of about 180° C. or more and about 550° C. or less, for example, to thermally cure the resin to form the first layer of the conductive resin layer. Thereafter, the conductive resin paste for a second layer is applied onto the first layer of the conductive resin layer, and the heat treatment is performed preferably at a temperature of about 180° C. or more and about 550° C. or less, for example, to thermally cure the resin to form a second layer of the conductive resin layer. Thereafter, the conductive resin paste for a third layer is applied onto the second layer of the conductive resin layer, and the heat treatment is performed preferably at a temperature of about 180° C. or more and about 550° C. or less, for example, to thermally cure the resin to form a third layer of the conductive resin layer.

As a method of applying each of the first layer, the second layer and the third layer of the conductive resin layer, for example, a dipping method, a screen method, or a roller application method can be used.

Further, the void volume in each layer of the first layer, the second layer, and the third layer defining the conductive resin layer can be adjusted by the amount of metal powder (PVC) included in the conductive resin paste of each layer, the amount of additives, the temperature when each layer of the conductive resin layer is cured, and the like.

Further, when the length of the first layer in contact with a portion of the first and second main surfaces and a portion of the first and second side surfaces is denoted as Dimension A, the length of the second layer in contact with a portion of the first and second main surfaces and a portion of the first and second side surfaces is denoted as Dimension B, and the length of the third layer in contact with a portion of the first and second main surfaces and a portion of the first and second side surfaces is denoted as Dimension C, the ratio of each dimension represented by Dimension A, Dimension B, and Dimension C can be controlled by adjusting the blade clearance at the time of the dipping method, the entry amount of the laminated body into the paste, the viscosity of the paste, and the like when the conductive resin paste is applied by the dipping method. As a result, the target ratio is achieved by controlling the wetting amount of the conductive resin paste to the first main surface, the second main surface, the first side surface, and the second side surface of the laminated body.

Thereafter, a plating layer is formed on the conductive resin layer. The plating layer is formed, for example, by electrolytic plating, electroless plating, or the like.

As described above, the multilayer ceramic capacitor 10 shown in FIG. 1 is manufactured.

3. Experimental Example

Next, in order to validate the advantageous effects of the multilayer ceramic electronic components according to preferred embodiments of the present invention described above, a multilayer ceramic capacitor was manufactured as a multilayer ceramic electronic component, and samples in which the void volume and the dimension ratio of each layer of the conductive resin layer were changed were prepared, and the substrate bending test was performed to validate the number of cohesive failure of the second layer in which cohesive failure occurs and the number of generation of flexural cracks in the laminated body. In addition, for some samples, the ESR of the samples after the substrate bending test was measured to validate the reliability of the multilayer ceramic capacitor.

(1) Specification of Samples in Experimental Example

First, in order to prepare samples for sample numbers 1 to 23, multilayer ceramic capacitors having the following specifications were produced according to the method of manufacturing the multilayer ceramic electronic component described above.

Size L×W=T (including design values) of multilayer ceramic capacitor: about 3.2 mm×about 1.6 mm×about 1.6 mm Ceramic layer material: $BaTiO_3$ Capacitance: about 1 μF Rated voltage: about 50V Structure of external electrode Base electrode layer: Electrode end surface film thickness containing conductive metal (Cu) and glass component: about 80 μm First layer, second layer, and third layer of the conductive resin layer: metal filler: Ag coated Cu Resin: Epoxy Thermal curing temperature: about 200° C.

The thickness of the first and the second conductive resin layers at the central portion of the first and the second base electrode layers in the height direction located on the first end surface and the second end surface: about 80 μm The thickness of the first and the second conductive resin layers at the central portion of the first and the second base electrode layers in the length direction located on the first main surface and the second main surface, and the first side surface and the second side surface: about 30 μm See Tables 1 to 6 for the void volume calculated based on Equation (1) for each layer of the first layer, the second layer, and the third layer in the samples with the respective sample numbers.

See Tables 1 to 6 for the dimension ratio of each layer of the first layer, the second layer, and the third layer in the samples with the respective sample numbers.

Plating layer: Two-layer structure of Ni plating layer (thickness: about 3 μm) and Sn plating layer (thickness: about 4 μm)

When the sample numbers 1 to 23 were prepared, a dipping method was used to produce each of the first layer, the second layer, and the third layer of the conductive resin layer in the step of forming the conductive resin layer.

Further, the void volume in each of the first layer, the second layer, and the third layer of the conductive resin layer was controlled by adjusting the amount of metal powder (PVC).

Furthermore, the dimension ratio of Dimension A, Dimension B, and Dimension C of each of the first layer, the second layer, and the third layer of the conductive resin layer was controlled by adjusting the blade clearance.

(2) Each Measurement Method (a) Calculation Method of Void Volume

The void volume was calculated using the following equation.

$$\text{Void volume (vol \%)} = (a-b-c)/a \times 100$$

a: Measured film thickness (physical thickness)

b: Metal film thickness (fluorescent X-ray film thickness)

c: Theoretical resin film thickness calculated from b (calculated from PVC)

Here, as shown in FIG. 6, the measured film thickness (physical thickness) a was measured by polishing the multilayer ceramic capacitor along the surface of the first side surface or the second side surface up to about a half length (that is, about ½ W) of the length in the direction connecting the first side surface and the second side surface vertically with respect to either of the first side surface or the second side surface of the multilayer ceramic capacitor, and then, obtaining, in the polished cross-section, the dimensions of the first layer, the second layer, and the third layer at the thickest point of the conductive resin layer on the first side surface, the second side surface or the first main surface, and the second main surface from the cross-section image.

Further, as shown in FIG. 7, the metal film thickness (fluorescent X-ray film thickness) b was measured by cutting out the conductive resin piece P defined by "the measured film thickness a×the width with the same length as the measured film thickness a" at the point where the measured film thickness (physical thickness) a was measured, emitting fluorescent X-rays from a direction I perpendicular or substantially perpendicular to the direction in which the measured film thickness (physical thickness) a using the fluorescent X-ray measurement apparatus (SFT9400 manufactured by Hitachi High-Tech Science Corporation), and then, obtaining the fluorescent X-ray intensity of the metal component positioned on a straight line with respect to the measured film thickness direction, and regarding the value obtained by converting the result to a thickness as a metal film thickness (fluorescent X-ray film thickness) b.

Further, the theoretical resin film thickness c was determined as follows. That is, first, TG-DTA in an air atmosphere was performed on the conductive resin piece P obtained for measurement of the metal film thickness (fluorescent X-ray film thickness) b, and the weight loss at a temperature of about room temperature or more and about 900° C. or less was measured. Since the weight loss corresponds to the resin component in the conductive resin layer, the volume ratio was calculated from the specific gravity of the metal component and the specific gravity of the resin component (which is one for convenience) to determine the PVC. The theoretical resin film thickness c was calculated based on the PVC. The PVC shows the volume ratio of metal powder/(metal powder+resin) among metal powder and resin contained in the conductive resin layer.

(b) Method of Measuring Dimension Ratio of Each Layer of Conductive Resin Layer

The multilayer ceramic capacitor, as a sample, was polished along the first side surface or the second side surface up to about a half length (about ½ W) of the length in the direction connecting the first side surface and the second side surface vertically with respect to either of the first side surface or the second side surface of the multilayer ceramic capacitor. After that, in the polished cross-section, the dimension of the first layer of the conductive resin layer in contact with the first main surface and the second main surface in the length direction z in which the first end surface and the second end surface were connected was denoted as Dimension A, the dimension of the second layer of the conductive resin layer in contact with the first main surface and the second main surface in the length direction z in which the first end surface and the second end surface were connected was denoted as Dimension B, and the dimension of the third layer of the conductive resin layer in contact with the first main surface and the second main surface in the length direction z in which the first end surface and the second end surface were connected was denoted as Dimension C. Then, the sum of Dimensions A, B and C was defined as 100, and the dimension ratio of each layer was calculated.

(3) Test and Evaluation Method (a) Substrate Bending Test

First, a multilayer ceramic capacitor as a sample was mounted on a substrate having a thickness of about 1.6 mm using a solder paste. Then, the substrate was bent with a push rod having a diameter of about 1 mm on the side of the substrate where the multilayer ceramic capacitor was not mounted, and a mechanical stress was applied to perform a substrate bending test. At this time, the holding time was about 5 seconds, the amount of bending was about 5 mm, and the number of samples was 30 for each sample. After the substrate bending test, the multilayer ceramic capacitor was removed from the substrate, and the presence or absence of cohesive failure was determined by the method described below.

(b) A Method of Determining Cracks in the Laminated Body after Bending of the Substrate and Cohesive Failure of the Second Layer After the substrate bending test, the solder was melted using a hot plate, the multilayer ceramic capacitor was removed from the substrate, and resin was embedded in a state of being turned about 90 degrees from the mounted state. After that, the multilayer ceramic capacitor was polished along the first side surface or the second side surface up to about a half length (about ½ W) of the length in the direction connecting the first side surface and the second side surface vertically with respect to either of the first main surface and the second main surface, or the first side surface and the second side surface of the multilayer ceramic capacitor. After that, in the polished cross-section, the multilayer ceramic capacitor was observed with a microscope with a magnification of at least 10 times or more, and the number of samples in which cracks generated in the laminated body and the number of samples in which the fracture development generated in the second layer of the conductive resin layer were counted.

The count of the fracture development was performed on the external electrode of both the first external electrode and the second external electrode of a multilayer ceramic capacitor.

(c) ESR Measurement Method

The multilayer ceramic capacitor as a sample was mounted on a substrate with solder paste, and the equivalent series resistance (ESR) was measured under the condition of a measurement frequency of about 10 MHz using a network analyzer (E5061B manufactured by Keysight Technologies Inc.).

The evaluation results are shown in Tables 1 to 6. Table 1 shows the result of changing the void volume in the first layer, Table 2 shows the result of changing the void volume in the second layer, and Table 3 shows the result of changing the void volume in the third layer. Table 4 shows the result of changing the ratio of Dimension A of the first layer, Table 5 shows the result of changing Dimension B of the second layer, and Table 6 shows the result of changing Dimension C of the third layer. In addition, the sample whose sample number i*mark is out of the scope of the present invention.

TABLE 1

|  |  | First layer | Second layer | Third layer | Number of generations of fracture development to second layer (the number of pieces) | Number of generations of cracks into laminated body (the number of pieces) |
|---|---|---|---|---|---|---|
| Sample 1 | Void volume (vol %) | 0 | 24 | 5 | 12/60 | 0/30 |
|  | Dimension ratio | 39 | 40 | 21 |  |  |
| Sample 2 | Void volume (vol %) | 5 | 24 | 6 | 9/60 | 0/30 |
|  | Dimension ratio | 40 | 40 | 20 |  |  |
| Sample 3 | Void volume (vol %) | 10 | 24 | 6 | 20/60 | 0/30 |
|  | Dimension ratio | 41 | 41 | 18 |  |  |
| *Sample 4 | Void volume (vol %) | 23 | 24 | 7 | 23/60 | 2/30 |
|  | Dimension ratio | 40 | 39 | 21 |  |  |

TABLE 2

|  |  | First layer | Second layer | Third layer | Number of generations of fracture development to second layer (the number of pieces) | Number of generations of cracks into laminated body (the number of pieces) | ESR(mΩ) |
|---|---|---|---|---|---|---|---|
| *Sample 5 | Void volume (vol %) | 5 | 8 | 6 | 0/60 | 1/30 | 83 |
|  | Dimension ratio | 40 | 41 | 19 |  |  |  |

TABLE 2-continued

|  |  | First layer | Second layer | Third layer | Number of generations of fracture development to second layer (the number of pieces) | Number of generations of cracks into laminated body (the number of pieces) | ESR(mΩ) |
|---|---|---|---|---|---|---|---|
| Sample 6 | Void volume (vol %) | 5 | 16 | 5 | 1/60 | 0/30 | 82 |
|  | Dimension ratio | 37 | 38 | 25 |  |  |  |
| Sample 2 | Void volume (vol %) | 5 | 24 | 6 | 9/60 | 0/30 | 84 |
|  | Dimension ratio | 40 | 40 | 20 |  |  |  |
| Sample 7 | Void volume (vol %) | 5 | 30 | 6 | 55/60 | 0/30 | 83 |
|  | Dimension ratio | 30 | 40 | 24 |  |  |  |
| Sample 8 | Void volume (vol %) | 6 | 50 | 7 | 60/60 | 0/30 | 230 |
|  | Dimension ratio | 38 | 41 | 21 |  |  |  |

TABLE 3

|  |  | First layer | Second layer | Third layer | Number of generations of fracture development to second layer (the number of pieces) | Number of generations of cracks into laminated body (the number of pieces) |
|---|---|---|---|---|---|---|
| Sample 9 | Void volume (vol %) | 5 | 22 | 0 | 12/60 | 0/30 |
|  | Dimension ratio | 39 | 40 | 21 |  |  |
| Sample 2 | Void volume (vol %) | 5 | 24 | 6 | 9/60 | 0/30 |
|  | Dimension ratio | 40 | 40 | 20 |  |  |
| Sample 10 | Void volume (vol %) | 4 | 24 | 10 | 16/60 | 0/30 |
|  | Dimension ratio | 40 | 41 | 19 |  |  |
| *Sample 11 | Void volume (vol %) | 6 | 19 | 22 | 0/60 | 3/30 |
|  | Dimension ratio | 43 | 39 | 18 |  |  |

TABLE 4

|  |  | First layer | Second layer | Third layer | Number of generations of fracture development to second layer (the number of pieces) | Number of generations of cracks into laminated body (the number of pieces) |
|---|---|---|---|---|---|---|
| *Sample 12 | Void volume (vol %) | 5 | 24 | 3 | 12/60 | 1/30 |
|  | Dimension ratio | 4 | 58 | 38 |  |  |
| Sample 13 | Void volume (vol %) | 5 | 24 | 5 | 6/60 | 0/30 |
|  | Dimension ratio | 15 | 37 | 48 |  |  |
| Sample 2 | Void volume (vol %) | 5 | 24 | 6 | 9/60 | 0/30 |
|  | Dimension ratio | 40 | 40 | 20 |  |  |
| Sample 14 | Void volume (vol %) | 5 | 24 | 8 | 3/60 | 0/30 |
|  | Dimension ratio | 70 | 16 | 14 |  |  |
| *Sample 15 | Void volume (vol %) | 3 | 24 | 6 | 0/60 | 2/30 |
|  | Dimension ratio | 90 | 6 | 4 |  |  |

TABLE 5

|  |  | First layer | Second layer | Third layer | Number of generations of fracture development to second layer (the number of pieces) | Number of generations of cracks into laminated body (the number of pieces) |
|---|---|---|---|---|---|---|
| *Sample 16 | Void volume (vol %) | 4 | 24 | 3 | 0/60 | 5/30 |
|  | Dimension ratio | 37 | 5 | 58 |  |  |
| Sample 17 | Void volume (vol %) | 6 | 24 | 6 | 2/60 | 0/30 |
|  | Dimension ratio | 54 | 10 | 36 |  |  |
| Sample 2 | Void volume (vol %) | 5 | 24 | 6 | 9/60 | 0/30 |
|  | Dimension ratio | 40 | 40 | 20 |  |  |
| Sample 18 | Void volume (vol %) | 5 | 24 | 5 | 28/60 | 0/30 |
|  | Dimension ratio | 18 | 65 | 17 |  |  |
| *Sample 19 | Void volume (vol %) | 5 | 24 | 4 | 0/60 | 2/30 |
|  | Dimension ratio | 12 | 82 | 6 |  |  |

TABLE 6

| | | First layer | Second layer | Third layer | Number of generations of fracture development to second layer (the number of pieces) | Number of generations of cracks into laminated body (the number of pieces) |
|---|---|---|---|---|---|---|
| * Sample 20 | Void volume (vol %) | 5 | 24 | 6 | 0/60 | 2/30 |
| | Dimension ratio | 36 | 61 | 3 | | |
| Sample 21 | Void volume (vol %) | 4 | 23 | 6 | 4/60 | 0/30 |
| | Dimension ratio | 46 | 44 | 10 | | |
| Sample 2 | Void volume (vol %) | 5 | 24 | 6 | 9/60 | 0/30 |
| | Dimension ratio | 40 | 40 | 20 | | |
| Sample 22 | Void volume (vol %) | 5 | 24 | 6 | 6/60 | 0/30 |
| | Dimension ratio | 22 | 13 | 65 | | |
| * Sample 23 | Void volume (vol %) | 5 | 21 | 6 | 0/60 | 3/30 |
| | Dimension ratio | 13 | 7 | 80 | | |

(3) Experimental results

Tables 1 to 3 show the experimental results when the void volume in each layer of the first layer, the second layer and the third layer is changed. Samples with any of the sample numbers 1 to 11 shown in Tables 1 to 3 satisfy the condition of Dimension A:Dimension B:Dimension C=about 15 to about 70:about 10 to about 65:about 10 to about 65 (where the ratio of Dimension A+the ratio of Dimension B+the ratio of Dimension C=100).

First, as shown in Table 1, samples with sample number 1, sample number 2 and sample number 3 have the void volume in the first layer of the conductive resin layer of about 10 vol % or less, the void volume in the second layer of the conductive resin layer of about 16 vol % or more, and the void volume in the third layer of the conductive resin layer of about 10 vol % or less, so that any samples with the above sample numbers had some pieces which developed the fracture of the second layer of the conductive resin layer, the fail-safe function occurred, and no cracks in the laminated body were found in 30 pieces.

On the other hand, the sample with sample number 4 has the void volume in the first layer of the conductive resin layer of about 23 vol %, which exceeded about 10 vol %, so that cracks in the laminated body generated in two of 30 pieces.

Next, as shown in Table 2, samples with sample number 6, sample number 2, sample number 7, and sample number 8 have the void volume in the second layer of the conductive resin layer of about 16 vol % or more, the void volume in the first layer of the conductive resin layer of about 10 vol % or less, and the void volume in the third layer of the conductive resin layer of about 10 vol % or less, so that any samples with the above sample numbers had some pieces which developed the fracture of the second layer of the conductive resin layer, the fail-safe function occurred, and no cracks in the laminated body were found in 30 pieces.

On the other hand, the sample with sample number 5 has the void volume in the second layer of the conductive resin layer of about 8 vol %, which is smaller than about 16 vol %, so that cracks in the laminated body generated in one in 30 pieces.

According to the result of the ESR measurement, the sample with the sample number 8 has the void volume in the second layer of the conductive resin layer of about 50 vol %, which exceeds about 30 vol %, so that the conductive passage was disconnected due to the large void volume, the conductivity of the conductive resin layer was lowered, and the ESR was about 230 mΩ which was higher than that of the other samples.

In addition, as shown in Table 3, samples with sample number 9, sample number 2, and sample number 10 have the void volume in the third layer of the conductive resin layer of about 10 vol % or less, the void volume in the first layer of the conductive resin layer of about 10 vol % or less, and the void volume in the second layer of the conductive resin layer of about 16 vol % or more, so that any samples with the above sample numbers had some pieces which developed the fracture of the second layer of the conductive resin layer, the fail-safe function occurred, and no cracks in the laminated body were found in 30 pieces.

On the other hand, the sample of sample number 11 has the void volume in the third layer of the conductive resin layer of about 22 vol %, which exceeds about 10 vol %, so that cracks in the laminated body generated in 3 out of 30 pieces.

Next, Tables 4 to 6 show experimental results of changing Dimension A, Dimension B, and Dimension C. Any samples with the sample number 2 and the sample numbers 12 to 23 shown in Tables 4 to 6 have the void volume in the first layer and the third layer of about 10 vol % or less, and the void volume in the second layer of about 16 vol % or more.

First, as shown in Table 4, samples with sample number 13, sample number 2, and sample number 14 have the ratio of Dimension A of about 15 or more and about 70 or less, the ratio of Dimension B of about 10 or more and about 65 or less, and the ratio of Dimension C of about 10 or more and about 65 or less, so that any samples with the above sample numbers had some pieces which developed the fracture of the second layer of the conductive resin layer, the fail-safe function occurred, and no cracks in the laminated body were found in 30 pieces.

On the other hand, the sample of sample number 12 has a ratio of Dimension A of about 4, which is smaller than about 15, so that cracks in the laminated body generated in one of 30 pieces, and the sample of sample number 15 has a ratio of Dimension A of about 90, which exceeds about 70, so that cracks in the laminated body generated in two of 30 pieces.

Next, as shown in Table 5, samples with sample number 17, sample number 2, and sample number 18 have the ratio of Dimension B of about 10 or more and about 65 or less, the ratio of Dimension A of about 15 or more and about 70 or less, and the ratio of Dimension C of about 10 or more and about 65 or less, so that any samples with the above sample numbers had some pieces which developed the fracture of the second layer of the conductive resin layer, the fail-safe function occurred, and no cracks in the laminated body were found in 30 pieces.

On the other hand, the sample of sample number 16 has a ratio of Dimension B of about 5, which is smaller than about 10, so that cracks in the laminated body generated in five of 30 pieces, and the sample of sample number 19 has a ratio of at least Dimension B of about 82, which exceeds about 65, so that cracks in the laminated body generated in two of 30 pieces.

In addition, as shown in Table 6, samples with sample number 21, sample number 2, and sample number 22 have the ratio of Dimension C of about 10 or more and about 65 or less, the ratio of Dimension A of about 15 or more and about 70 or less, and the ratio of Dimension B of about 10 or more and about 65 or less, so that any samples with the above sample numbers had some pieces which developed the fracture of the second layer of the conductive resin layer, the fail-safe function occurred, and no cracks in the laminated body were found in 30 pieces.

On the other hand, the sample with sample number 20 has a ratio of Dimension C of about 3, which is smaller than about 10, so that cracks in the laminated body generated in two of 30 pieces, and the sample with sample number 23 has a ratio of at least Dimension C of about 80, which exceeds about 65, so that cracks in the laminated body generated in three of 30 pieces.

From the above results, in the multilayer ceramic electronic component, the conductive resin layer includes the first layer located on the base electrode layer, the second layer located on the first layer, and the third layer located on the second layer. With respect to the first layer and the third layer, the void volume determined by Equation (1) is about 10 vol % or less, with respect to the second layer, the void volume determined by Equation (1) is about 16 vol % or more, and when the length of the first layer in contact with part of the first and second main surfaces, and the first and second side surfaces is denoted as Dimension A, the length of the second layer in contact with the first and second main surfaces, and a portion of the first and second side surfaces is denoted as Dimension B, and the length of the third layer in contact with a portion of the first and second main surfaces, and a portion of the first and second side surfaces is denoted as Dimension C, the ratio between Dimension A, Dimension B, and Dimension C is Dimension A:Dimension B:Dimension C=about 15 or more and about 70 or less:about 10 or more and about 65 or less:about 10 or more and about 65 or less (where the ratio of Dimension A+the ratio of Dimension B+the ratio of Dimension C=100), so that even if the substrate stress is applied to the mounting substrate on which the multilayer ceramic electronic component is mounted, it is possible to stably select the development destination of the fracture crack during the deflection test toward the conductive resin layer, and it was discovered that it was possible to reduce or prevent the generation of the fracture crack into the laminated body. As a result, it was discovered that it was possible to stabilize the fail-safe function against substrate bending stress, and it was possible to achieve both the mountability and conductivity which were originally required for the external electrode of the multilayer ceramic electronic component.

Preferred embodiments of the present invention are disclosed in the above description, but the present invention is not limited to this.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a laminated body including:
      a plurality of laminated ceramic layers and a plurality of laminated internal electrode layers;
      a first main surface and a second main surface facing each other in a lamination direction;
      a first side surface and a second side surface facing each other in a width direction orthogonal or substantially orthogonal to the lamination direction; and
      a first end surface and a second end surface facing each other in a length direction orthogonal or substantially orthogonal to the lamination direction and the width direction; wherein
      the plurality of internal electrode layers include a first internal electrode layer exposed at the first end surface, and a second internal electrode layer exposed at the second end surface;
   a first external electrode disposed on the first end surface connected to the first internal electrode layer, a portion of the first and second main surfaces, and a portion of the first and second side surfaces; and
   a second external electrode disposed on the second end surface connected to the second internal electrode layer, a portion of the first and second main surfaces, and a portion of the first and second side surfaces; wherein
   each of the first external electrode and the second external electrode includes:
      a base electrode layer including a metal;
      a conductive resin layer including a thermosetting resin and a metal component, the conductive resin layer being disposed on the base electrode layer; and
      a plating layer disposed on the conductive resin layer;
   the conductive resin layer includes:
      a first layer located on the base electrode layer;
      a second layer located on the first layer; and
      a third layer located on the second layer;
   the first layer and the third layer have a void volume of about 10 vol % or less, and the second layer has a void volume of about 16 vol % or more,
   the void volume (vol %) is calculated by the following equation:

void volume (vol %)=$(a-b-c)/a \times 100$, where a is a measured film thickness,
   b is a metal film thickness, and
   c is a theoretical resin film thickness calculated from PVC from b, below; and
      when a length of the first layer in contact with the portion of the first and second main surfaces, and the first and second side surfaces is denoted as Dimension A;
      a length of the second layer in contact with the first and second main surfaces, and the portion of the first and second side surfaces is denoted as Dimension B; and
      a length of the third layer in contact with the portion of the first and second main surfaces, and the portion of the first and second side surfaces is denoted as Dimension C;
      a ratio between the Dimension A, the Dimension B, and the Dimension C is Dimension A:Dimension B:Dimension C=about 15 or more and about 70 or less:about 10 or more and about 65 or less:about 10 or more and about 65 or less, where a ratio of Dimension A+a ratio of Dimension B+a ratio of Dimension C=100.

2. The multilayer ceramic electronic component according to claim 1, wherein the second layer has a void volume of about 30 vol % or less.

3. The multilayer ceramic electronic component according to claim 1, wherein the base electrode layer includes a glass component.

4. The multilayer ceramic electronic component according to claim 1, wherein a number of the plurality of ceramic layers is 15 or more and 200 or less.

5. The multilayer ceramic electronic component according to claim 1, wherein
the laminated body includes an outer layer portion including at least two of the plurality of ceramic layers and an inner layer portion including at least one of the plurality of ceramic layers and the plurality of internal electrode layers disposed thereon; and
the outer layer portion is located on a side of the first main surface and a side of the second main surface of the laminated body.

6. The multilayer ceramic electronic component according to claim 5, wherein a thickness of the outer layer portion is about 10 µm or more and about 300 µm or less.

7. The multilayer ceramic electronic component according to claim 1, wherein the laminated body has a dimension in the length direction of about 0.90 mm or more and about 5.40 mm or less, a dimension in the width direction of about 0.40 mm or more and about 4.92 mm or less, and a dimension in the lamination direction of about 0.40 mm or more and about 2.96 mm or less.

8. The multilayer ceramic electronic component according to claim 1, wherein the plurality of ceramic layers are made of a dielectric material.

9. The multilayer ceramic electronic component according to claim 8, wherein the dielectric material includes at least one of $BaTiO_3$, $CaTiO_3$, $SrTiO_3$, and $CaZrO_3$ as a main component.

10. The multilayer ceramic electronic component according to claim 1, wherein a thickness of each of the plurality of ceramic layers is about 0.5 µm or more and about 20.0 µm or less.

11. The multilayer ceramic electronic component according to claim 1, wherein the first internal electrode layer includes a first counter electrode portion facing the second internal electrode layer, and a first extended electrode portion located at one end of the first internal electrode layer and extended from the first counter electrode portion to the first end surface of the laminated body.

12. The multilayer ceramic electronic component according to claim 1, wherein the second internal electrode layer includes a second counter electrode portion facing the first internal electrode layer, and a second extended electrode portion located at one end of the second internal electrode layer and extended from the second counter electrode portion to the second end surface of the laminated body.

13. The multilayer ceramic electronic component according to claim 11, wherein the first counter electrode portion and the first extended electrode portion have a same or substantially a same width.

14. The multilayer ceramic electronic component according to claim 12, wherein the second counter electrode portion and the second extended electrode portion have a same or substantially a same width.

15. The multilayer ceramic electronic component according to claim 1, wherein the plurality of internal electrode layers include an alloy including at least one of Ni, Cu, Ag, Pd, and Au.

16. The multilayer ceramic electronic component according to claim 1, wherein each of the plurality of internal electrode layers has a thickness of about 0.2 µm or more and about 2.0 µm or less.

17. The multilayer ceramic electronic component according to claim 1, wherein a number of the plurality of internal electrode layers is 15 or more and 200 or less.

18. The multilayer ceramic electronic component according to claim 1, wherein the base electrode layer includes at least one of a baked layer, a plating layer, and a thin film layer.

* * * * *